United States Patent [19]

Miyoshi

[11] 3,827,697

[45] Aug. 6, 1974

[54] AUTOMATIC RECORD PLAYER

[75] Inventor: Seizo Miyoshi, Osaka, Japan

[73] Assignee: Matsushita Electric Industrial Co., Ltd., Osaka, Japan

[22] Filed: May 1, 1972

[21] Appl. No.: 249,109

[52] U.S. Cl. .......... 274/10 R
[51] Int. Cl. .......... G11b 17/16
[58] Field of Search .......... 274/10 R

[56] References Cited

UNITED STATES PATENTS

| | | | |
|---|---|---|---|
| 3,243,188 | 3/1966 | Caddy et al. | 274/10 R |
| 3,460,840 | 8/1969 | Koepke | 274/10 R |
| 3,549,153 | 12/1970 | Atsumi | 274/10 R |

*Primary Examiner*—Louis R. Prince
*Assistant Examiner*—Steven L. Stephan
*Attorney, Agent, or Firm*—Wenderoth, Lind & Ponack

[57] ABSTRACT

An automatic record player having a record changer by which a stack of records mounted on a changer spindle extending above the center of a turntable can be successively played out, wherein a cycle adjusting control is provided for enabling the record player to operate a predetermined number of times irrespective of the number of the records mounted on the changer spindle. To this end, there is provided an index wheel having a plurality of characters on its peripheral surface for showing the number of records left unplayed or the desired number of performance done by the record player in an operative association with the movement of the tone arm.

4 Claims, 8 Drawing Figures

AUTOMATIC RECORD PLAYER

Figure 1:
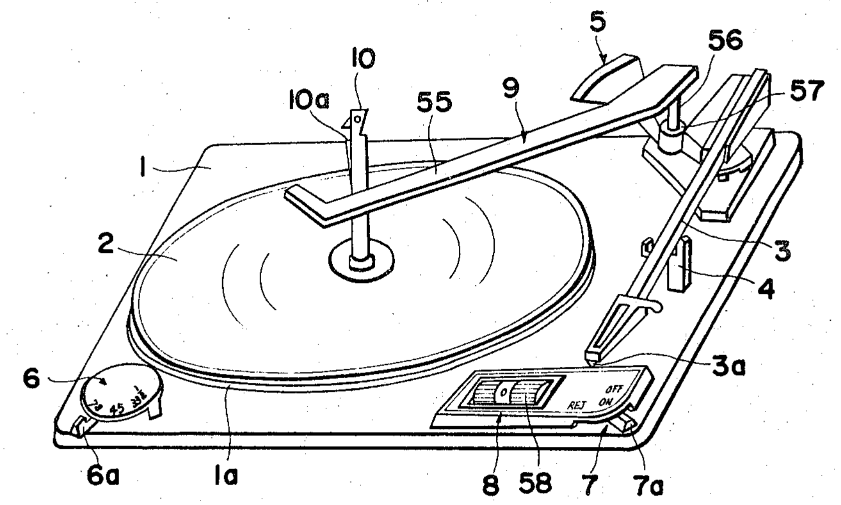

The present invention relates to an automatic record player.

More particularly, the present invention relates to an automatic record player having a record changer for automatically placing in position and playing successively each one of a stack of records, such record player being designed to have the capability to perform in the three following generalized situations;

1. if only one record is placed on the record player, the record can be played either once only or several times as desired, 2. if a number of records which number is equal to or less than the maximum number of repeated plays the record player can perform with respect to an individual record, are placed on the record player, only the last of these records can be played one or more times, respectively, and 3. during a period in which a plurality of records are in the process of being successively played one after another, the successive playing of these records can be automatically interrupted after some of these records have been played, without requiring the rejection knob to be triggered.

According to one exemplary type of automatic record player having an automatic record changer or auto-changer which is heretofore available, it is well known that the number of records initially set to the record player represents, in fact, the cycle of operation of the record player proper and that, if the successive playing of these records is to be interrupted after some of them have been played, the rejection knob must be triggered to maintain a tone arm in a resting position without a subsequent trace by the tone arm across any one of the remaining record or records. Moreover, if a single record is desired to be repeatedly played, the record player must be reset to operate each time the record completes.

While the prior art record player is designed such as hereinbefore described, enthusiastic listeners often feel it to be necessary or desirable that a record should be repeatedly played several times in succession.

Accordingly, an essential object of the present invention is to provide an automatic record player of the type referred to above which can perform in any one of the above above mentioned three situations with substantial elimination of the various disadvantages inherent in the prior art record player.

Another important object of the present invention is to provide an automatic record player of the type above referred to wherein there is provided a mechanism for adjusting the number of cycles of operation of the record player, each operational cycle corresponding to one complete performance of an individual record, whereby the above mentioned three capabilities can be easily achieved in a simple manner.

A further object of the presnt invention is to provide an automatic record player of the type above referred to wherein the cycle adjusting mechanism is of a simplified construction and can be therefore installed without requiring an additional space for operatively accommodating therein the various parts of the adjusting mechanism.

According to one preferred embodiment of the present invention, an automatic record player is shown as generally comprising a turntable; a turntable drive system including an electrically powered motor and an idler wheel for transmitting a rotational force of preselected value from the motor to the turntable; an auto-changer including a record size detector with which, during a period in which a stack of records of different sizes are in the process of being successively played, an exact lift-down of the tone arm at the lead-in groove on any one of the records can be advantageously ensured; and a cycle adjusting mechanism including a manually adjustable index wheel having a plurality of detent stop positions equally spaced through 360° rotation.

With the arrangement as hereinbefore described, the index wheel of the cycle adjusting mechanism may be provided, on its peripheral surface or rim, with sequential numerical characters corresponding to the number of the detent stop positions provided thereto according to the manufacturing design. These numerical characters may be provided thereon by any suitable method such as by engraving or by an printing technique, and denote the number of performances either already done by the record player or left undone by the record player. It is to be noted that the number of said detent stop positions provided of the index wheel is determined by the number of records which can be set or loaded on the record player. By way of example, if the record player is designed such that it has a capacity of 10 records, at least 12 detent stop positions must be provided, one of which is a "STOP" or "OFF" position in which the record player will not play a record.

The automatic record player so far described as comprising the various components except for the performance frequency control mechanism may be of the same type as disclosed in the U.S. Pat. No. 3,549,153 patented on Dec. 22, 1970, and assigned to the same assignee as of the present application.

The cycle adjusting mechanism incorporated in the automatic record player in accordance with the teachings of the present invention makes it possible to operate properly in any one of the above mentioned three situtations merely by manually adjusting the index wheel to a selected or desired one of the detent stop positions.

Figure 2:
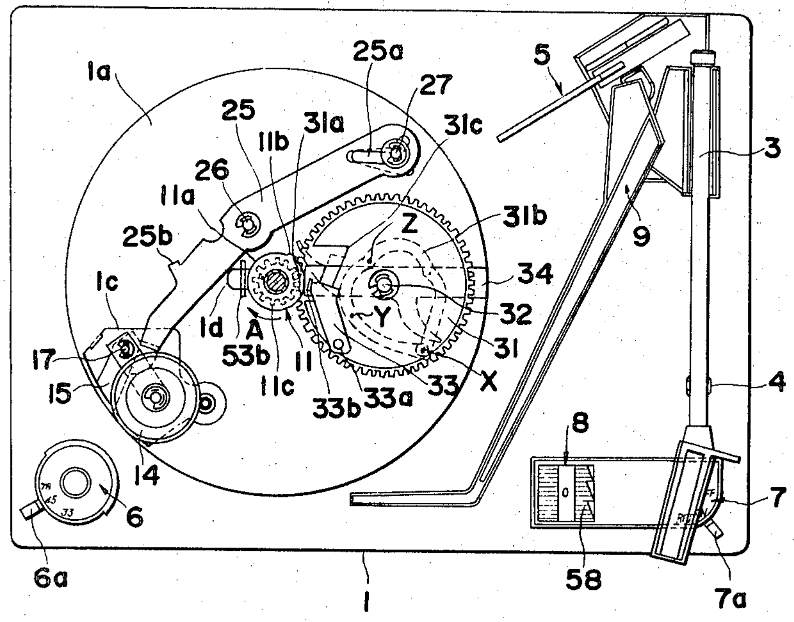
Figure 3:
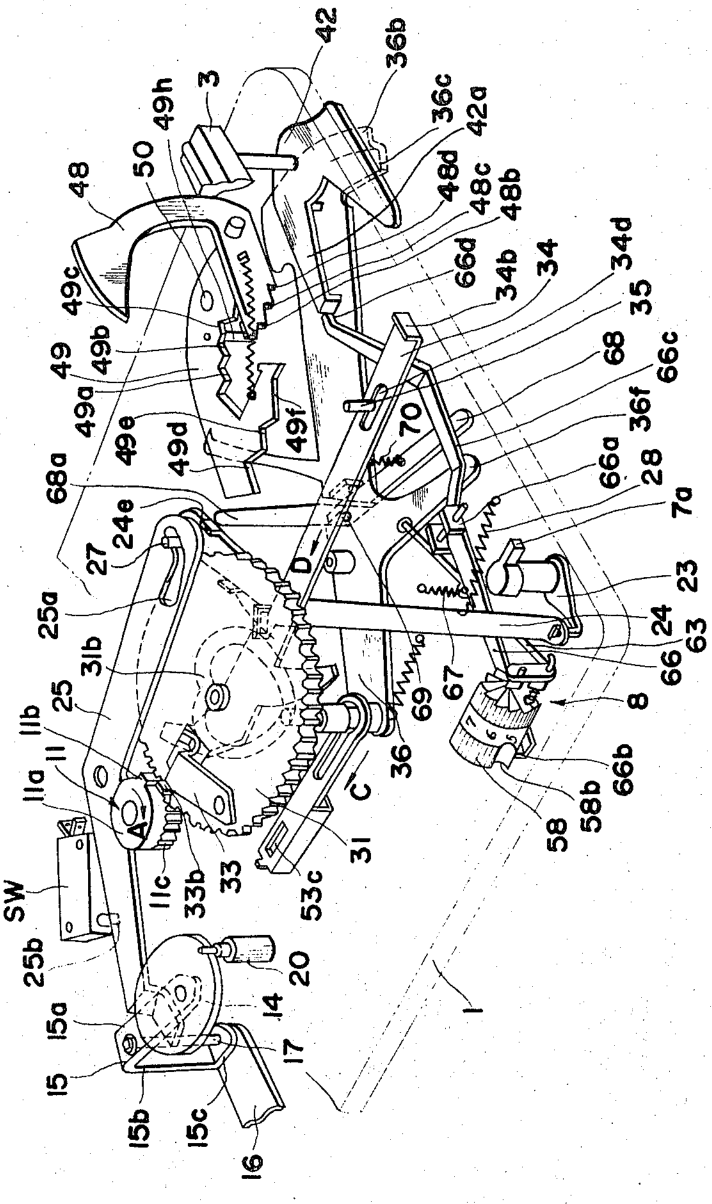
Figure 4:
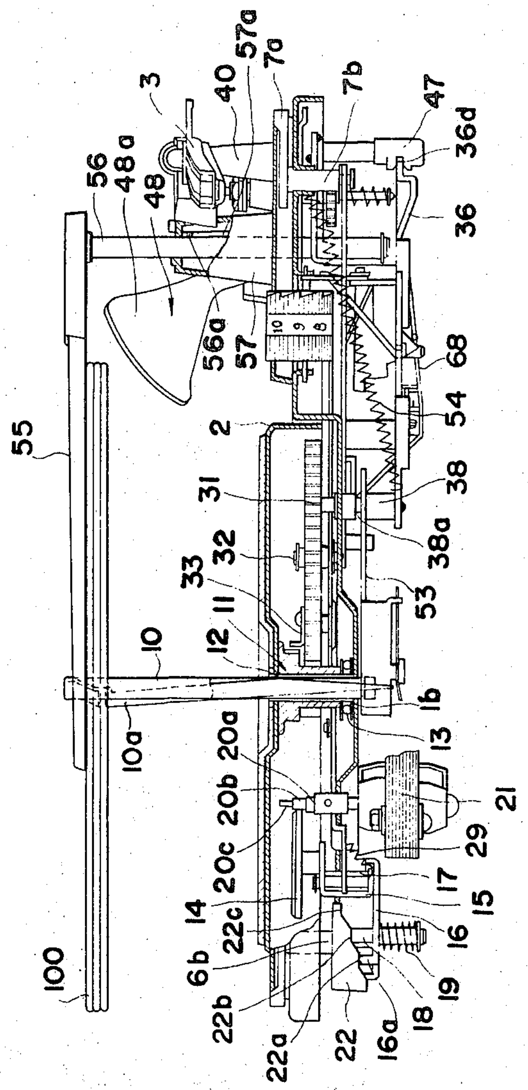
Figure 5:
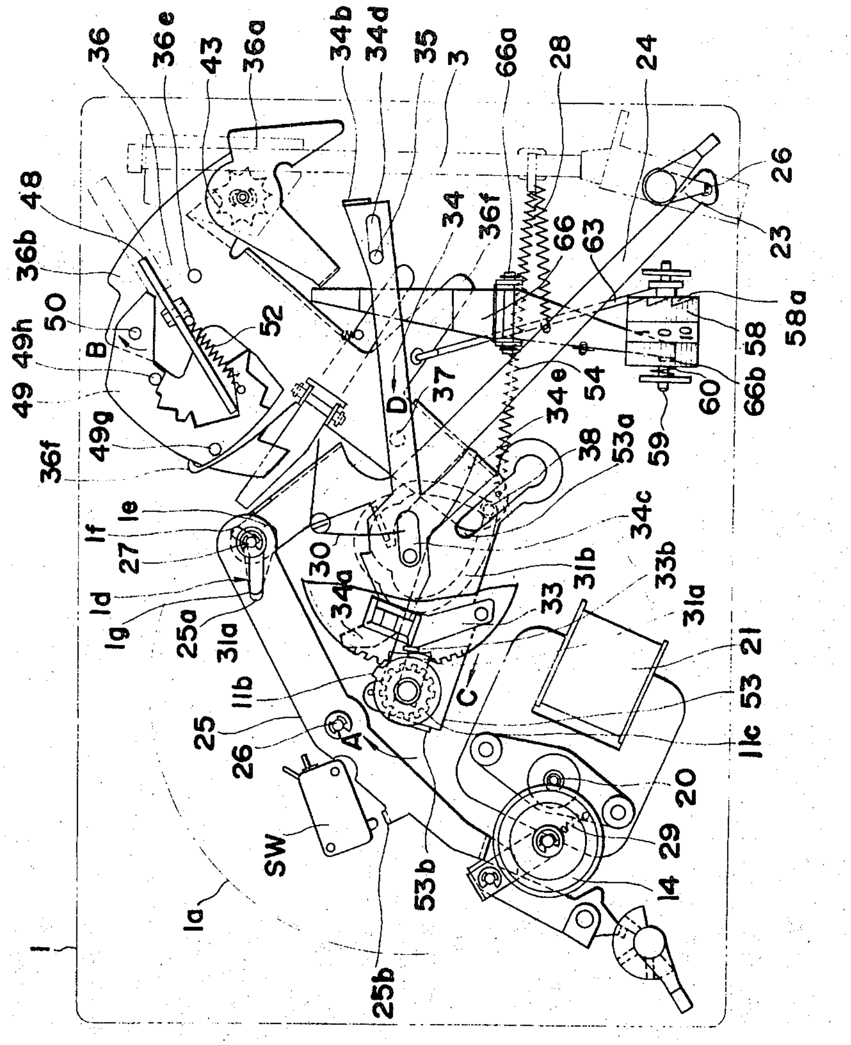
Figure 6:
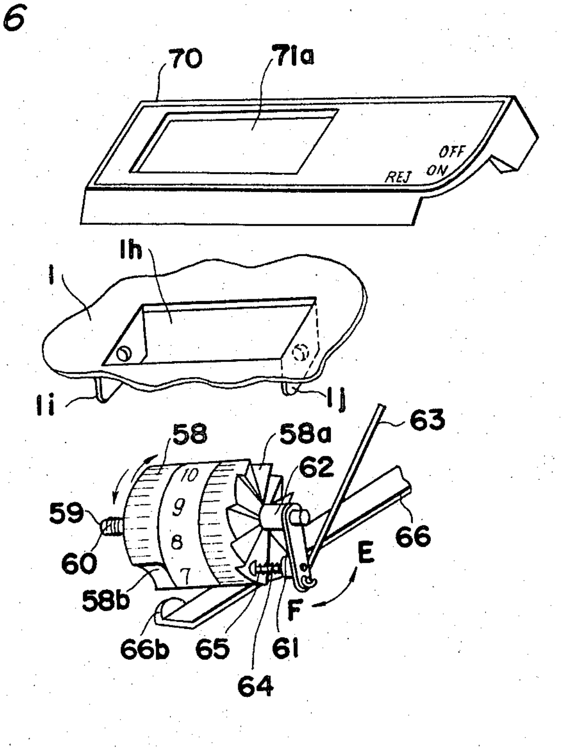
Figure 7:
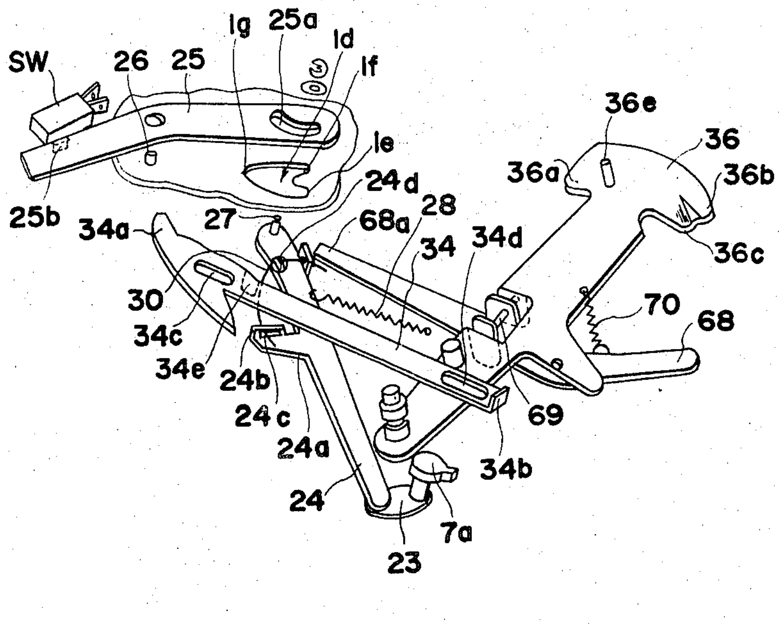
Figure 8:
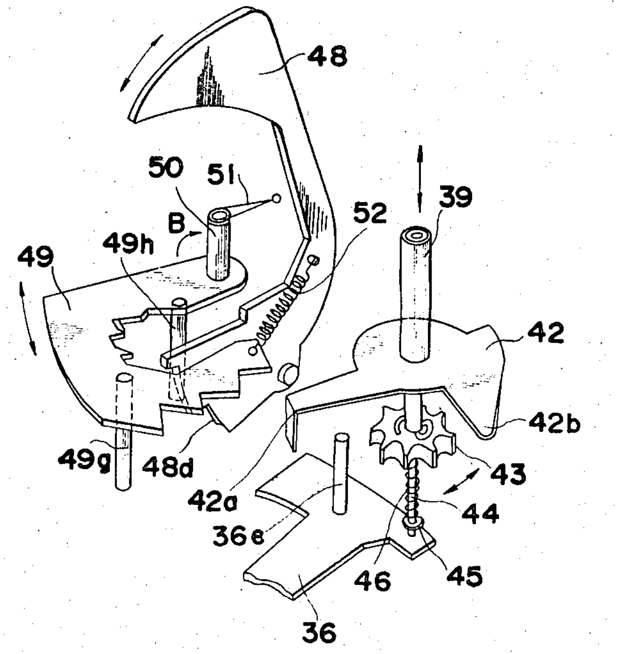

These and other objects and features of the present invention will become apparent from the following description taken in conjunction with one preferred form of embodiment thereof shown in the accompanying drawings, in which;

FIG. 1 is a schematic perspective view of an automatic record player embodying the present invention, showing an outer appearance of the arrangement disposed above a mounting panel thereof, FIG. 2 is a top plan view of the record player with a turntable being removed, FIG. 3 is a schematic perspective view, on an enlarged scale, of the record player with the mounting panel being shown as made of transparent material and portions thereof being broken away for the purpose of illustration of various component parts disposed below the mounting panel, FIG. 4 is a cross sectional view of the record player taken along the line IV—IV in FIG. 2 and shown on an enlarged scale, FIG. 5 is a cross sectional view of the record player taken along the line V—V in FIG. 4, FIG. 6 is an exploded view of portions of the cycle adjusting mechanism employed in the record player, the portions being shown on an enlarged scale, FIG. 7 is a partly exploded perspective view on an enlarged scale of the association among essential parts of the record player, and FIG. 8 is an exploded view of the record size detector and the root portion of the tone arm associated therewith and disposed below the mounting panel.

Before the description of the present invention proceeds, it is to be noted that like parts are designated by like reference numerals throughout the several views of the accompanying drawings. It is further to be noted that, for the sake of brevity, the description of the present invention will be hereinafter made in conjunction with an atuomatic record player having an accommodable capacity of 10 records.

Referring first to FIG. 1, the automatic record player so far shown therein comprises a mounting panel 1 which may be mounted on a suitable player base box (not shown) in any known manner. This mounting panel 1 is formed on an upper surface thereof with a circular recess 1a (clearly shown in FIG. 4) of a diameter slightly greater than the diameter of a turntable 2 which is rotatably accommodated therein. In addition to the turntable 2, the system comprises a tone arm 3 of any known construction having one end provided with a pickup stylus 3a and a portion adjacent to the other end thereof serving as a pivot about which the tone arm 3 swings from a resting position defined by a tone arm rest 4; a record size detector generally indicated by 5; a turntable rotating speed control 6 including a control knob 6a; a switching and rejection control 7 including a common triggering knob *7a;* a cycle adjusting unit 8; a spare record stabilizer arm 9; and a auto-changer spindle 10 for accommodating a stack of records thereon in a superposed relation and capable of dropping said records one after another onto the turntable 2.

These elements are disposed above the mounting panel 1 are are respectively operatively associated with internal mechanisms disposed within the recess *1a* of the mounting panel 1 and below the mounting panel 1, such internal mechanisms being clearly shown in FIG. 2 to FIG. 8.

Referring now to FIGS. 2 to 8 and, particularly, FIGS. 2 to 5, the turntable 2 is formed at its center with a hole through which the changer spindle 10 extends as is well known to those skilled in the art. This turntable 2 is further formed on its undersurface with a hollow stud 11 in alignment with the axis of said hole of the turntable 2. The hollow stud 11 has one end formed with a larger diameter portion *11a* integrally secured to said turntable and having the periphery thereof provided with a projection *11b*, the other end being formed into a free end and an intermediate portion between said larger diameter portion *11a* and the free end being formed with a geared portion *11c*.

At the center of the recess 1a of the mounting panel 1, a bearing hole *1b* is formed and a bushing 12 having an inner diameter slightly greater than the diameter of the changer spindle 10 is outwardly extended at right angles to the plane of the mounting panel 1 with its lower end rigidly secured to said mounting panel in alignment with said bearing hole *1b*. This bushing 12 is adapted to rotatably support the turntable 2 with the bushing 12 extending through the stud 11 of the turntable while a suitable ring bearing 13 (FIG. 4) is mounted on said bushing 12 and interposed between the free end of the stud 11 and the mounting panel 1 for facilitating a smooth rotation of the turntable with substantial elimination of frictional resistance which may be created therebetween.

Within the recess 1a of the mounting panel 1 and adjacent to the annular wall defining said recess *1a*, the mounting panel 1 is formed with a suitable opening *1c* through which an idler wheel 14 is outwardly exposed. As clearly shown in FIG. 3, this idler wheel 14 is supported by a substantially channel-shaped supporting strip 15 having a long section *15a*, a vertical section 15b and a short section *15c*, an extended end of said long section 15a being rotatably mounted with said idler wheel 14. While a lower half of the vertical section *15b* and the short section *15c* is situated inwardly of the mounting panel, the supporting strip 15 is rotatably mounted on the adjacent end of an idler arm 16 by means of an elongated pin 17 having a lower end rigidly secured to that end of the idler arm 16 and its other end extending through the short section *15c* and the long section 15a in parallel relation to the vertical section *15b* and provided with a suitable fastening member such as a snap ring on the free end extremity of said elongated pin 17.

The idler arm 16 is, as clearly shown in FIG. 4, formed with an upwardly bent end *16a* and operatively mounted on a rod member 18 downwardly extending from the undersurface of the mounting panel 1 through said idler arm 16 at a position adjacent to the upwardly bent end *16a*. This idler arm 16 is vertically slidable along the rod member 18 and is normally upwardly biased by the action of a compression spring 19 having one end suitably secured to the lower end of the rod member 18 and the other end being in contact with the idler arm 16. These elements particularly those designated by 14, 15 and 16 are operatively associated with the turntable rotating speed control 6 as will be mentioned later.

As is well known to those skilled in the art, the idler wheel 14 is, either sequentially or synchronously, in contact with a stepped capstan 20 and an annular flange of the turntable 2 so that a rotational force generated by a motor 21 having a drive shaft integral with said capstan and secured in any known manner to the undersurface of the mounting panel 1 can be transmitted therethrough to the turntable 2 causing the latter to rotate in a given direction at a preselected speed.

The speed control 6 includes the control knob *6a* as hereinbefore described. This control knob *6a* is provided with a helically stepped cam 22 rigidly connected therewith by means of a suitable shaft *6b* extending through the mounting panel 1. The helically stepped cam 22 has, for example, three steps *22a*, *22b* and *22c* to which the upwardly bent end *16a* of the idler arm 16 can be selectively contacted. These steps *22a*, *22b* and *22c* define positions of the control knob *6a*, for example, the "78," "45 " and "33½" positions, respectively, which designate the standardized speeds of the turntable. Likewisely, the capstan 20 has three steps *20a*, *20b* and *20c* which are respectively operatively associated with the steps *22a*, *22b* and *22c* of the speed selector cam 22.

In the condition of the speed control 6 as shown in FIG. 4 (also in FIG. 1), the control knob 6a is set to the "78" position, in which condition the bent end *16a* of the idler arm 16 is in contact with the step *22a* of the cam 22 and the idler wheel 14 is in position to contact with the step *20c* of the capstan 20 so that the turntable 2 can be rotated at a speed of 78 revolutions per minute. If the control knob 6a is moved to the "33½" position accompanyied by the rotation of the cam 22, the idler arm 16 can be permitted to upwardly shift by the action of the spring 19 with the bent end 16*a* thereof being brought into contact with the step 22*c* of the cam 22. During this process, the upward shift of the idler arm 16 causes the idler wheel 14 to contact the step 20*a* of the capstan 20 so that the turntable 2 can be adjusted to rotate at a speed of 33 ½ revolutions per minute.

A manner by which the idler wheel 14 can be brought into position to transmit the rotational force from the motor 21 to the turntable 2 will be hereinafter described with particular reference to FIGS. 2, 3, 5 and 6. To this end, the switching and rejection control 7 as provided as includes the common triggering knob 7*a* having three positions such as the "OFF", "ON" and "REJ" positions (FIGS. 1 and 2). This triggering knob 7*a* is operatively associated with the speed control 6 by means of linkage elements such as are designated by 23, 24, and 25 connected to one another in a manner as will be mentioned later.

The triggering knob 7*a* has a shaft 7*b* (FIG. 4) integrally formed therewith and extending through a suitable hole formed in the mounting panel 1 with a lower free end of said shaft 7*b* rigidly connected with the shaft 23. The shaft 23 is in turn pivotally connected with an intermediate lever 24 by means of a suitable pin member at 26. The intermediate lever 24 carries at the other end portion thereof an upright pin 27 which projects above the mounting panel 1 within the recess 1*a* through a shaped opening 1d formed with first, second and third slots 1*e*, 1*f* and 1*g* into which the upright pin 27 of the intermediate lever 24 can be selectively collapsed in response to the operation of the triggering knob 7*a* as will be mentioned later. This intermediate lever 24 is normally biased by a tension spring 28, which is operatively connected between a suitable portion of the lever 24 and a suitable portion of the mounting panel 1 beneath the latter, such that the upright pin 27 of the lever 24 is, when the triggering knob 7*a* is set to the "OFF" position, normally engaged in the first slot 1*e* of the shaped opening 1d and, when the triggering knob 7*a* is set to the "OFF" position, normally engaged in the second slot 1*f* thereof. More specifically, the tension spring 28 is arranged in cooperative relation with the shaped opening 1*d* such that, if the triggering knob 7*a* is moved from either the "OFF" position or the "ON" position to the "REJ" position causing the upright pin 27 to be guided from the first or second slot 1*e* or 1*f* of the shaped opening 1d to the third slot 1*g*, said tension spring permits the triggering knob 7*a* to instantaneously return only to the "ON" position in which condition the upright pin 27 of the intermediate lever 24 is engaged in the second slot 1f of the shaped opening 1d, said upright pin 27 being returned to the first slot 1*e* only when the triggering knob 7*a* is manually switched to the "OFF" position.

The operating lever 25 for transmitting the movement of the triggering knob 7*a* in cooperation with the intermediate lever 24 to the idler wheel is pivotally connected at its intermediate portion with the mounting panel 1 at 26 and disposed above said panel 1 within the recess 1*a*. This operating lever 25 has one tapered end and the other end formed with a curved guide slot 25*a* which is in turn loosely connected with the upright pin 27 of the intermediate lever 24. The shape of the curved guide slot 25*a* is such that, when the upright pin 27 is guided from the first slot 1*e* to the second slot 1*f*, said operating lever 25 can be rotated about the pivot 26 in a direction such that the tapered end of said lever 25, which is normally in contact with an intermediate portion of the elongated pin 17 (FIGS. 3 and 4) permits the idler wheel 14 to come into contact with the capstan 20 and at the same time with the flange of the turntable 2. In other words, upon rotation of the operating lever 25 in the manner as hereinabove described, the idler wheel carrying strip 15 can be moved by the action of a tension spring 29, which is disposed between the short section 15*c* thereof and a suitable portion of the mounting panel 1, so that the idler wheel can be brought into an operative position.

On the other hand, when the upright pin 27 is guided from the second slot 1*f* to the third slot 1*g* and instantaneously back to the second slot 1*f*, the operating lever 25 does not undergo any substantial movement while permitting the idler wheel 14 to be maintained in the operative position. Of course, when the upright pin 27 is in the first slot 1*e* of the shaped opening 1*d* in which condition the triggering knob 7*a* is in the "OFF" position, the operating lever is conditioned such that the idler wheel 14 is displaced from the capstan 20 and the flange of the turntable 2.

The operating lever 25 is further formed at a portion substantially between the pivot 26 and its tapered end with a downwardly projecting piece 25*b* extending through a suitable hole of the mounting panel 1 and situated beneath said mounting panel 1. This projecting piece 25b of the operating lever 25 is adapted to operate a microswitch SW disposed between a power source (not shown) and the motor 21 in such a manner that said switch SW can be turned on only when the operating lever 25 is rotated such that its tapered end causes the idler wheel 14 to rotate the turntable.

While in the arrangement as hereinbefore described, the intermediate lever 24 is, as clearly shown in FIG. 7, formed at its intermediate portion with a laterally extending arm 24*a* having an upright member 24*b* integral therewith, the bent edge between said arm 24*a* and the member 24*b* being formed with a guide slot 24*c*. A wire spring 30 is attached to this intermediate lever 24 in such a way that one end thereof is suitably secured to a portion of the lever 24 adjacent to the upright pin 27 and the other end thereof is slidably inserted in said guide slot 24*c*, an intermediate portion thereof being supported by another portion of the lever 24 as indicated at 24*d*. The operation of this wire spring 30 will be further described below.

The arrangement of auto-changer will be now described with particular reference to FIGS. 2 to 5.

In the vicinity of the geared portion 11c of the hollow stud 11 secured to the undersurface of the turntable 2 as hereinbefore described, a gear wheel 31 of sufficient thickness is rotatably mounted on a shaft 32 fixed on the mounting panel 1. This gear wheel 31 has a notch 31*a* formed in the peripheral edge thereof and a substantially heart-shaped groove 31*b* of which the opening is faced towards the depth of the recess 1a of the mounting panel. The heart-shaped groove 31*b* is, as clearly shown in FIG. 2, formed in the body of the gear wheel 31 and has its substantial center positioned in an offset relation with respect to the body of said wheel 31. This gear wheel 31 is mounted on its upper surface with an actuating member 33 in proximity to the notch 31a, said actuating member 33 having one end rotatably connected with said wheel at 33*a* and the other end downwardly extending through a window 31*c*, formed in the gear wheel 31, and resting on an actuating plate 34. The actuating member 33 is also formed with an engagement 33*b* upwardly extending therefrom so that said engagement 33*b* is engageable with the projection 11*b* of the hollow stud 11 as will be mentioned later.

The actuating plate 34 is shaped substantially as shown in FIG. 5 or 7 and has a shaped end 34*a* situated substantially below the window 31*c* of the gear wheel 31 and the other end formed with an upwardly bent end 34*b* while an intermediate portion of said plate 34 is slidably extended through a slit formed in a portion of the surrounding wall of the recess 1*a*. This actuating plate 34 is also formed at portions adjacent to the ends 34*a* and 34*b* with a pair of slots 34*c* and 34*d*, respectively, said slot 34*c* being received by the shaft 32 while said slot 34d being received by a pin 35 integrally downwardly extending from the undersurface of the mounting panel 1, whereby said actuating plate 34 can be movable toward and away from the bushing 12 for bearing the turntable 2.

As clearly shown in FIG. 7, this actuating plate 34 is also formed at 34e with a downwardly extending lug engageable with the wire spring 30 provided in the intermediate lever 24 as hereinbefore described. The engagement between the downwardly extending lug 34*e* of the actuating plate 34 and the wire spring 30 in the lever 24 is such that only when the triggering knob 7*a* is moved from or past the "ON" position toward the "REJ" position, that portion of the wire spring 30 commences to contact the lug 34*e* and thus causes the actuating plate 34 to move toward the bushing 12 in accordance with the movement of the triggering knob 7*a*. The movement of this actuating plate 34 in the direction toward the bushing 12 accompanies a pivotal movement of the actuating member 33 about the pivot 33*a* such that the engagement 33*b* of the actuating member 33 is positioned above the notch 31*a* of the gear wheel 31 and thus in the circular path of travel of the projection 11*b*.

A driving plate 36 is pivotally mounted at 37 on the undersurface of the mounting panel 1 and has one end rigidly secured with an upright boss 38 which extends through an opening formed in the mounting panel 1 within the recess 1*a*. A free end of this upright boss 38 is operatively engaged in the heart-shaped groove 31*b* of the gear wheel 31 so that, as the gear wheel 31 is rotated, the driving plate 36 undergoes a lateral swinging motion about the pivot 37 while the upright boss 38 is guided along the groove 31*b* of the gear wheel 31. This rotation of the gear wheel 31 can be caused when the projection 11*b* of the stud 11 rotating in the direction as indicated by the arrow A together with the turntable 2 abuts the engagement 33*b* of the actuating member 33 thereby permitting the geared portion 11*c* to be meshed with the geared peripheral edge of the gear wheel 31. It is to be noted that the gear wheel 31 undergoes one rotation each time the engagement between the engagement 33*b* of the actuating member 33 and the projection 11b of the stud 11 integral with the turntable 2 takes place. In other words, during a continuous rotation of the turntable 2, each tooth crest of the geared portion 11*c* of the stud 11 is successively accommodated within the notch 31*a* of the gear wheel 31 without engaging the geared peripheral edge of the gear wheel 31.

The upright boss 38 on the driving plate 36 is adapted to contact an arm portion 34*e* formed in the actuating plate 34 substantially as shown in FIG. 5 during the movement of the boss 38 as guided by the groove 31*b*, so that the actuating plate 34, that has been moved to the bushing 12, can be retracted from the bushing 12 and positioned substantially as shown therein.

The other end of the driving plate 36 has a substantially T-shaped configuration having a pair of laterally extending tone arm shifting portion 36*a* and record size detector actuating portion 36*b* of the configuration as will be mentioned later.

Turning now to a tone arm shifting mechanism and with particular reference to FIG. 8, the tone arm 3 has the other end pivotally connected with a bracket (not shown) which is in turn rotatably connected to the adjacent end of a sleeve 39 in any known manner. The sleeve 39 extends vertically through a bearing block 40 (FIG. 4) rigidly mounted on a suitable corner of the upper surface of the mounting panel 1, the other end of said sleeve 39 being situated beneath the mounting panel 1 and terminating at a position close to the tone arm shifting portion 36*a* of the driving plate 36. The arrangement so far described may be of any known construction such as disclosed in the foregoing United States Patent. However, it is to be noted that the tone arm must be rotatable about the axis of the sleeve 39 in the direction parallel to the plane of the mounting panel and concurrently pivotable in the direction perpendicular to the plane of the mounting panel 1 about the pivotal point formed between that end of the tone arm and the bracket for the reason known to those skilled in the art.

The sleeve 39 is rigidly mounted, at its intermediate portion beneath the mounting panel 1, with a positioning plate 42 of substantially V-configuration and carries at the other end a geneva wheel 43 loosely mounted thereon. Slidably extending through the sleeve 39 is a pushing rod 44 having a pair of opposed ends situated outside the corresponding ends of the sleeve 39 and provided with detent rings, only one of which is shown as indicated by 45. This pushing rod 44 is normally urged downwardly by the action of a compression spring 46 having one end resting on the detent ring 45 and the other end abutting against the geneva wheel 43. It is to be noted that the geneva wheel 43 is frictionally in contact with the positioning plate 42 by means of the compression spring 46 so that, unless a resistance is imparted to the rotation of the sleeve 39 or the positioning plate 42, this geneva wheel 43 can be rotatable together with the sleeve or the positioning plate.

The tone arm shifting portion 36*a* of the driving plate 36 is formed at 36*c* (FIG. 3) with a downwardly oriented slope by which, as the driving plate 36 undergoes the lateral swinging motion described hereinabove, the pushing rod 44 can be lifted up and down through the sleeve 39 causing the tone arm 3 to swing in the direction perpendicular to the plane of the mounting panel 1. This tone arm shifting portion 36*a* is slidably supported at 36*d* (FIG. 4) by a supporter 47 downwardly extending from the undersurface of the mounting panel 1.

The driving plate 36 is also provided with an upright pin 36e at a position substantially between the tone arm shifting portion 36a and the record size detector actuating portion 36b thereof, said upright pin 36e being adapted to rotate the geneva wheel by the contact therewith.

The record size detector 5 includes a detecting plate 48 having a detecting segment 48a (FIG. 4) outwardly projecting above the mounting panel 1 and the other end formed, as clearly shown in FIG. 3, with a plurality of steps such as indicated by 48b, 48c and 48d, an intermediate portion thereof being pivotally connected to a supporting member (not shown) mounted on the undersurface of the mounting panel 1 so tcribed may be of any known construction such as disclosed in the foregoing United States Patent. However, it is to be noted that the tone arm must be rotatable about the axis of the sleeve 39 in the direction parallel to the plane of the mounting panel and concurrently pivotable in the direction perpendicular to the plane of the mounting panel 1 about the pivotal point formed between that end of the tone arm and the bracket for the reason known to those skilled in the art.

The sleeve 39 is rigidly mounted, at its intermediate portion beneath the mounting panel 1, with a positioning plate 42 of substantially V-configuration and carries at the other end a geneva wheel 43 loosely mounted thereon. Slidably extending through the sleeve 39 is a pushing rod 44 having a pair of opposed ends situated outside the corresponding ends of the sleeve 39 and provided with detent rings, only one of which is shown as indicated by 45. This pushing rod 44 is normally urged downwardly by the action of a compression spring 46 having one end resting on the detent ring 45 and the other end abutting against the geneva wheel 43. It is to be noted that the geneva wheel 43 is frictionally in contact with the positioning plate 42 by means of the compression spring 46 so that, unless a resistance is imparted to the rotation of the sleeve 39 or the positioning plate 42, this geneva wheel 43 can be rotatable together with the sleeve or the positioning plate.

The tone arm shifting portion 36a of the driving plate 36 is formed at 36c (FIG. 3) with a downwardly oriented slope by which, as the driving plate 36 undergoes the lateral swinging motion described hereinabove, the pushing rod 44 can be lifted up and down through the sleeve 39 causing the tone arm 3 to swing in the direction perpendicular to the plane of the mounting panel 1. This tone arm shifting portion 36a is slidably supported at 36d (FIG. 4) by a supporter 47 downwardly extending from the undersurface of the mounting panel 1.

The driving plate 36 is also provided with an upright pin 36e at a position substantially between the tone arm shifting portion 36a and the record size detector actuating portion 36b thereof, said upright pin 36e being adapted to rotate the geneva wheel by the contact therewith.

The record size detector 5 includes a detecting plate 48 having a detecting segment 48a (FIG. 4) outwardly projecting above the mounting panel 1 and the other end formed, as clearly shown in FIG. 3, with a plurality of steps such as indicated by 48b, 48c and 48d, an intermediate portion thereof being pivotally connected to a supporting member (not shown) mounted on the undersurface of the mounting panel 1 so that said detecting plate 48 can be rotated in the plane perpendicular to that of the mounting panel 1. The record size detector 5 further includes an index plate 49 provided at an inner edge with inwardly recessed portions 49a, 49b and 49c for respective engagement with the steps 48b, 48c and 48d of the detecting plate 48 as will be mentioned later. The outer edge of the index plate 49 is also provided with steps 49d, 49e and 49f for engagement with a restricting member 42a formed on the positioning plate 42 integrally movable with the tone arm 3, so that the angle of rotation of the tone arm in the plane parallel to the mounting panel 1 can be determined such as to permit the pickup stylus 3a to be lifted down onto the lead-in groove of a record depending upon the size of such record. This index plate 49 is pivotally supported at 50 by a downwardly extending pin and normally biased in the direction as indicated by the arrow B in FIG. 5 by the action of a wire spring 51 disposed between said index plate 49 and a suitable portion of the undersurface of the mounting panel 1. This index plate is also connected with the detecting plate 48 by a tension spring 52 whereby the detecting segment 48a of the detecting plate 48 is normally biased toward the turntable 2 about its pivot point which is provided at the intermediate portion thereof.

The index plate 49 is provided on its undersurface with a pair of downwardly extending rods 49g and 49h spaced with respect to each other. One of the rods 49g of said plate 49 is adapted to be engaged by an elongated tongue member 36f formed in the driving plate 36 whereby, as the driving plate 36 is laterally swung about the pivot 37 to an extent that the pushing rod 44 is lifted upwardly by the tone arm lifting portion 36a, the index plate 49 can be brought into an operative position in which any one of the recessed portions 49a, 49b and 49c thereof is ready to engage with the steps 48b, 48c and 48d depending upon the size of a record to be played. It is to be noted that the steps 38b, 38c and 38d of the detecting plate 49 are respectively in position to engage with the recessed portion 49a, 49b and 49c of the index plate 49 and that the engagement between each one of the steps 48b, 48c or 48d and the corresponding one of the recessed portions 49a, 49b or 49c is assumed, for example, to represent a record of the diameter of 17 cm., 25 cm., or 30 cm., respectively. Similarly, when the 17 cm., 25cm., or 30 cm. record is used, the restricting member 42a of the positioning plate 42 will be engaged to the step 49f, 49e or 49d of the index plate 49, respectively.

The index plate 49, which has been brought to its operative position, can be returned to its original position only when the detector actuating portion 36a of the driving plate 36 abuts during its movement against the other rod 49h on the index plate 49 thereby permitting the index plate 49 to rotate about the pin 50 in the direction opposite to the direction indicated by the arrow B.

For permitting a plurality of records 100 mounted on the changer spindle 10 to successively fall onto the turntable 2, a feed link 53 is provided which is formed at one end with a sliding slot 53a whose opposite edges are in sliding engagement with a reduced diameter portion 38a formed in an intermediate portion of the upright boss 38. The end of the feed link 53 remote from the sliding slot 53a is formed in a lateral U-shaped cross-sectional configuration and the end extremity of the upper section of said U-shaped end is formed with a T-shaped projection 53*b* which is slidably received in a slot 1*d* formed in the mounting panel 1. In the upper section of the U-shaped end of the feed link 53 is formed a throughhole 53*c* which serves to retain the spindle 10 and has a feeder 10*a* extending therethrough. The feeder 10*a* is integrally connected to said spindle 10 and serves to allow the records 100 on the spindle 10 to drop onto the turntable 2 one after another in a known manner. In the lower section of the U-shaped end of the feed link 53 an opening is formed by which the feeder 10a extending therethrough is actuated upon a movement of the feed link 53. The feed link 53 is normally biased in a return direction by a tension spring 54, so that it makes a reciprocal movement as the upright boss 38 slides in the slot 53*a* with its end guided along and within the heart-shaped groove 31*b* of the gear wheel 31.

From the foregoing, it has now become clear that, when the gear wheel 31 is rotated in the direction opposite to the direction of rotation of the turntable 2 such that the point Y of the groove 31*b* reaches a position where the point X of the groove 31*b* was located (FIG. 2) the upright boss 38 is moved substantially in the direction toward the shaft 32 causing the feed link 53 to move in the direction as indicated by the arrow C against the tension spring 54 (FIG. 5) so that the feeder 10a of the spindle 10 can be brought into a retracted position in which condition the lowermost one of the records 100 falls under gravity onto the turntable 2.

It is also clear that, during this process, the index plate 49 is brought into operative position upon the lateral swing motion of the driving plate 36 accompanied by the movement of the upright boss 38. While in this condition, as the lowermost one of the records 100 mounted on the changer spindle 10 falls on to the turntable 2, the periphery of said record contacts the detecting segment 48*a* of the detecting plate 48 causing the latter to rearwardly pivot so that one of the steps 48*b*, 48*c* or 48*d* receives the corresponding one of the recessed portions 49*a*, 49*b* or 49*c* of the index plate 49, thus defining the angle between the tone arm rest 4 and the lead-in groove of the record on the turntable 2 as a function of the size of the record on the turntable through which the tone arm 3 can be rotated at the beginning of the playing operation.

The record stabilizer 9 includes a record depressing arm 55 for holding the stack of records 100 on the spindle 10 in a horizontal position. This depressing arm 55 is supported by an upright post 56 which is in turn journalled in a support sleeve 57 upstanding on the mounting panel 1 in the vicinity of the tone arm 3 and the detector 5 as shown in FIG. 1. The post 56 has a stopper pin 56a formed on the peripheral wall thereof while the support sleeve 57 has a guide groove 57*a* formed in the inner wall thereof in the lengthwise direction for receiving said stopper pin which slides therethrough as the depressing arm 55 is moved up and down.

The cycle adjusting mechanism comprises an index wheel 58 of substantially cylindrical shape, an intermediate portion of the peripheral surface thereof being provided with series numbers, "0" through "10," and a character "STOP" saidwiched between the numbers "0" and "10," substantially as shown in FIG. 6. This index roller 58 has a shaft 59 coaxially extended therethrough in a non-rotatable manner and formed at one end with a plurality of saw teeth 58*a* each radially inwardly extending on the face of said end of said wheel 58 and at the other end with a recess 58*b* arranged on the peripheral surface of said roller. It is to be noted that in the embodiment as shown the record player is assumed as to have a capacity of 10 records and saw teeth 58*a* are thus provided.

This index wheel 58 is operatively supported in an opening 1h formed in the mounting panel 1 in such a manner that both ends of the shaft 59 are respectively journalled in a pair of holes formed in opposed bearing lugs 1i and 1j downwardly extending from the mounting panel 1. While in this condition, a compression spring 60 is interposed around the end of the shaft 59 adjacent to the bearing lug 1*i* between said bearing lug 1*i* and the opposite end face of the roller 58 so that a sufficient frictional force is imparted to the rotation of the wheel 58. The other end of the shaft 59 carries thereon a bracket piece 61 having one end rotatably mounted on that end of the shaft 59 in a spaced relation to the saw teeth 58*a* by means of a suitable bushing 62 and the other free end connected with the elongated tongue member 36*f* by means of a connecting rod 63 said tongue member 36*f* being formed on the driving plate 36 and extending in a plane substantially perpendicular to the connecting rod 63.

The bracket piece 61 is provided at a position adjacent to said other end thereof with a detent pin having a head end in contact with the saw teeth 58*a* and the other free end extending through said piece 61 and connected with a suitable stopper (not shown) for preventing a separation between said detent pin 64 and said bracket piece 61. A compression spring 65 is interposed between the head end of the detent pin 64 and the bracket piece 61 so that said detent pin 64 is normally urged toward the saw teeth 58*a* of the roller 58.

As clearly shown in FIG. 3, the cycle adjusting mechanism further includes a seesaw member 66 pivotally secured at its intermediate portion, as indicated by 66*a*, to the undersurface of the mounting panel 1. This seesaw member 66 has one end adjacent to the roller formed with a feeler 66*b* for engagement into the recess 58*b* as the latter approaches thereto. The other end of said seesaw member 66 is downwardly bent at 66*c* with respect to the undersurface of said mounting panel 1 and terminates at a position adjacent to the path of travel of the restricting member 42*a* of the positioning plate 42. More specifically, the seesaw member 66 is normally biased about its pivot 66*a* by the action of a tension spring 67 so that the feeler 66*b* is upwardly shifted while the curved end extremity 66*d* is downwardly shifted to restrict the movement of the restricting member 42*a* and thus the positioning plate 42. However, unless the feeler 66*b* on the seesaw member 66 is engaged in the recess 58*b* of the roller 58, the feeler 66*b* is in sliding engagement with the peripheral surface of the roller whereby the curved end extremity 66*d* of the seesaw member 66 is in position to permit the movement of the positioning plate 42, in which condition said end extremity 66*d* is positioned between the upper surface of the restricting member 42*a* of the positioning plate 42 and the undersurface of the mounting panel 1.

The seesaw member 66 is operatively associated with a stopper lever 68 having one end in contact with the curved portion 66*c* of the seesaw member 66 and the other end being formed into a stopper 68*a* engageable with an engagement piece 24*e* formed on the end of the intermediate lever 24 adjacent to the upright pin 27, the substantially intermediate portion thereof being pivotally mounted on the driving plate 36 as at 69 and extending across the driving plate 36. This stopper lever 68 is normally biased by a tension spring 70 so that the first mentioned end of said lever 68 is in contact with the curved portion 66*c* of the seesaw member 66. In the arrangement as hereinbefore described, the engagement between the stopper 68*a* and the engagement piece 24*e* can be effected only when the feeler 66*b* of the seesaw member 66 is in sliding engagement with the peripheral surface of the roller 58, said stopper 68*a* is otherwise not in a position to restrict the movement of the intermediate lever 24. It is to be noted that, if the engagement therebetween takes place, the upright pin 27 on the intermediate lever 24 situating within the opening 25*a*, which has been moved to the slot 1*g*, can be shifted to the slot 1*e* without engaging in the slot 1f by the action of the tension spring 28 normally pulling the intermediate lever 24 in the direction as hereinbefore described.

The arrangement of the numbers zero through ten on the peripheral surface of the index wheel 58 is such that the number "0" is, when the feeler 66*b* falls into the recess 58*b*, brought into register with a window 71*a* of a covering 71 rigidly secured on the upper surface of the mounting panel 1 for covering the index wheel 58 and the triggering knob 7*a* as shown in FIG. 1. The index wheel is rotatable in one direction so that the numbers on the peripheral surface thereof can be intermittently successively brought into register with the window 71*a* in a decreasing sequence of from "10" to "0" before the character "STOP" is registered with the window 71*a*, designating the number of records still left unplayed by the record player.

The index wheel has a number of detent stop positions substantially equal to the number of the saw teeth 58a and the intermittent rotation of said index wheel 58 from one detent stop position to another can be effected by the detent pin 64 on the bracket piece 61 pivotable about the axis of the shaft 59. In other words, if the bracket piece 61 is rotated in the direction E as indicated in FIG. 6, the head end of the detent pin 64 slides over the slope on one tooth surface of any one of the saw teeth 58a while backwardly retracting against the action of the compression spring 65 without rotating the index wheel and finally falling on to the bottom land between one saw tooth and the following saw tooth by the action of the spring 65. Upon subsequent rotation of the bracket piece 61 in the opposite direction F, the head end of the detent pin 64 shifts the relevant saw tooth from one position to another causing the index wheel 58 to rotate from one detent stop position to the following detent stop position.

The operation of the record player of the construction as hereinbefore fully described will be now described.

It is first assumed that the 10 records are mounted on the changer spindle 10 while the tone arm 3 is resting on the tone arm rest 4. Prior to the operation of a record player constructed in accordance with the teachings of the present invention, one must rotate the index wheel 58 until the number "0" on the peripheral surface of said wheel become positioned just below the window 71*a* of the covering 71. In this condition, it is to be noted that, since the feeler 66*b* on the seesaw member 66 is resting on the peripheral surface of the index wheel, the curved end extremity 66*d* of said member 66 and the stopper 68*a* on the stopper lever 68 are in position as not to hamper the movement of the positioning plate 42 and the intermediate lever 24, respectively, as hereinbefore described.

When the triggering knob 7*a* is subsequently rotated from the "OFF" position to the "REJ" position past the "ON" position, the operating lever 25 pivots about the pivot 26 in a clockwise direction with the downwardly projecting piece 25*b* switching the switch SW on so that the motor 21 is activated. When the triggering knob 7*a* reaches the "REJ" position, the idler wheel 14 is brought into an engaged position by the operating lever 25 and this causes the turntable 2 to rotate in a clockwise direction. During this process, the intermediate lever 24 for transmitting the motion of the triggering knob 7*a* to the operating lever 25 operates such that that the portion of the wire spring 30 mounted thereon pushes the actuating plate 34 in the direction D so that the end of the actuating member 33 which is resting on the curved end 34*a* of the actuating plate 34 is pivoted about its pivot with the engagement 33*b* thereof being positioned in the circular path of travel of the projection 11*b* of the turntable stud 11.

As the turntable rotates, the projection 11*b* of the turntable stud 11 abuts against the engagement 33*b* thereby permitting the geared portion 11c of said turntable stud 11 to be meshed with the geared periphery of the gear wheel 31 to rotate the latter in the direction opposite to the direction of rotation of the turntable 2. Upon rotation of the gear wheel 31, the upright boss 38 on the driving plate 36 undergoes a camming motion guided by the heart-shaped groove 31*b* of the gear wheel 31. The camming motion of this upright boss 38 results in a swinging motion of the driving plate 36 in the opposite directions about the pin 37 during one rotation of the gear wheel 31.

However, at the time the gear wheel 31 completes approximately one third of a revolution, the driving plate 36 is conditioned such that the tone arm pushing rod 44 is upwardly shifted against the spring 46 by the tone arm lifting portion 36*a* of the driving plate 36 thereby positioning the tone arm 3 in an upwardly lifted position, the index plate 49 is brought into its operative position by the engagement between the elongated tongue member 36*f* of the driving plate 36 and the downwardly extending rod 49*g* of the index plate 49 and the upright pin 36*e* of the driving plate 36 is in position to engage the geneva wheel 43, while the upright boss 38 on the end of the driving plate 36 adjacent to the gear wheel 31 is in position to push the feed link 53 in the direction C.

As the gear wheel 31 is further rotated, the point Z of the groove 31b of the gear wheel 31 passes above the path of travel of the upright boss 38, in which condition the upright pin 36e of the driving plate 36 rotates the geneva wheel 43 without moving the tone arm 3. This can be achieved because, while the tone arm 3 is designed such that it does not rotate in the clockwise direction from the arm rest 4 and onwards, the friction between the geneva wheel 43 and the positioning plate 42 integrally connected with the tone arm 3 through the sleeve 39 can be overcome by a pushing force which is given by the upright pin 36e to the geneva wheel 43.

Concurrently therewith, the feed link 53 is moved to the direction C causing the feeder 10a to be brought into a retracted position thereby permitting the lowermost one of the records 100 to fall onto the rotating turntable.

As the record falls onto the rotating turntable, the periphery of said record contacts with the detecting segment 48*a* of the detecting plate 48 causing the latter to rearwardly pivot so that one of the steps 48*b*, 48*c* or 48*d* receives the corresponding one of the recessed portion 49*a*, 49*b* or 49*c* of the index plate 49 depending upon the size of said record, thus defining the angle between the tone arm rest 4 and the lead-in groove of the record on the turntable 2 through which the tone arm 3 can be rotated about the sleeve 39 at the beginning of the playing operation. It is to be noted that the engagement between that one of the steps 48*b*, 48*c* or 48*d* and the corresponding one of the recessed portion 49*a*, 49*b* or 49*c* can be maintained for a while by a tension spring operatively connecting between the index plate 49 and the detecting plate 38.

After the point Z of the groove 31*b* of the gear wheel 31 has passed across the path of travel of the upright boss 38, the driving plate 36 undergoes a lateral swinging motion and returns to its original position. During this process, the upright pin 36e of the driving plate 36 again engages the geneva wheel 43 causing the sleeve 39 and hence the tone arm 3 which is in its upwardly shifted position to rotate about the axis of said sleeve 39 until the restricting member 42*a* of the positioning plate 42 rotatable integrally with said tone arm 3 abuts against the corresponding one of the steps 49*f*, 49*e* or 49*d* of the index plate 49, whereby the pickup stylus 3*a* of the tone arm 3 can be positioned exactly above the lead-in groove of the record on the turntable 2.

Upon completion of the return movement of the driving plate 36 to its original position, the index plate 49 is returned from the operative position to its original position by the engagement between the downwardly extending rod 49*g* of the index plate 49 and a portion of the driving plate 36. At the same time, the pushing rod 45 which has been upwardly shifted such as to maintain the tone arm in an upwardly lifted position slides down along the slope 36*c* whereby said rod 45 is downwardly shifted thereby permitting the pickup stylus 3*a* of the tone arm 3 to trace the lead-in groove of the record.

It is to be noted that, during the laterally reciprocal swinging motion of the driving plate 36 thus effected in the manner as hereinbefore described, the index wheel 58 of the cycle adjusting mechanism can be rotated such as to register the number "9" on the peripheral surface thereof with the window 71*a* of the covering 71 in the manner substantially as hereinbefore described, thus showing that the number of records still left unplayed is 9 records while the first one of the records in the record stack is being played.

It is clear that during a period in which the tone arm is in the process of playing the first record on the turntable, no resistance is imparted to the rotation of the positioning plate 42 and thus the tone arm 3 about the axis of the sleeve 39. However, when the pickup stylus 3*a* of the tone arm 3 arrives at the lead-out groove of the record upon the completion of the first playing operation, of the first record, the abutment arm 42*b* formed in the positioning plate 42 and movable integrally with the tone arm commences to contact all end of the actuating plate 34 causing the latter to move in the direction as indicated by the arrow D. As the actuating plate 34 is thus moved, the actuating member 33 on the gear wheel 31 is pivoted about the pivot such that the engagement 33*b* thereof is positioned above the notch 31*a* of the gear wheel and thus ready to receive a kick by the projection 11*b* of the turntable stud 11.

While in the condition as hereinabove described, the turntable stud 11 during its continuous rotation together with the turntable 2 abuts against the engagement 33*b* thus causing the gear wheel 31 to rotate in the manner substantially as hereinbefore described. The rotation of the gear wheel 31 at this time is for returning the tone arm 3 to the tone arm rest 4 and then back to the lead-in groove of the following second record. Of course, the various parts of the mechanisms undergo the substantially same operations as hereinbefore described during this second rotation of the gear wheel, completing one cycle of operation of the record player.

Thus, it is clear that each of the same cycle of operation as hereinbefore described is successively repeated until the last tenth record on the changer spindle 10 falls on the turntable. During the repeated cycles of the operation, the index wheel 58 is automatically rotated in the direction that the numbers "9," "8" .... and "0" on the peripheral surface of said index wheel 58 are successively registered with the viewing window 71*a* of the covering 71 on the mounting panel 1. When the number "0" appears below the window 71*a*, it shows that the whole number of the records have fallen onto the turntable and the last record is in the process of being played by the record player.

When the tenth record has been record, it is clear that the abutment arm 42*b* of the positioning plate 42 movable integrally with the tone arm 3 pushes the actuating plate 34 in the direction D causing the engagement 33*b* of the actuating member 33 on the gear wheel 31 to engage the projection 11*b* of the turntable stud 11 substantially as hereinbefore described. Thus, it is also clear that by the engagement between the engagement 33*b* and the projection 11*b*, the gear wheel 31 is rotated and, hence, the driving plate undergoes a reciprocal swinging motion.

More specifically, as the driving plate 36 is first pivoted in a clockwise direction, the tone arm lifting portion 36a thereof acts to lift the tone arm 3 upward to remove the pickup stylus 3*a* from the lead-out groove of the tenth record and then to return the tone arm in the upwardly shifted position to the tone arm rest 4. At the same time, the index plate 49 can be brought into an operative position by the engagement between the rod 49*g* and the elongated tongue member 36*f* of the driving plate 36 on one hand and on the other hand the head end of the detent pin 54 shifts one saw tooth from one detent stop position to another thereby permitting the character "STOP" on the peripheral surface of the index wheel 58 to be registered with the window 71*a* of the covering 71.

At the same time the index wheel 58 is rotated such as to register the character "STOP" with the window 71*a*, the feeler 66*b* is elastically collapsed into the recess 58*b* on the index wheel 58 in which condition the seesaw member 66 is pivoted such that the curved end extremity 66*d* thereof restricts the movement of the positioning plate 42 in the manner as hereinbefore described. It is to be noted that the pivotal movement of the seesaw member 66 accompanies a pivotal movement of the stopper lever 68 thus causing the stopper 68*a* on said lever 68 to be engageable with the engagement piece 24*e* on the end of the intermediate lever 24 adjacent to the upright pin 27 in a manner substantially as hereinbefore described.

While in the condition hereinbefore described, when the driving plate 36 is subsequently pivoted in a counterclockwise direction to restore it to its original position, the upright pin 36*e* on the T-shaped end of the driving plate 36 may try to rotate the positioning plate 42 which is in engagement with the geneva wheel 43. However, since the movement of the positioning plate 42 is at this time restricted by the curved end extremity 66*d* of the seesaw member 66 in the manner as hereinbefore described, the positioning plate 42 will no longer undergo any motion, only the geneva wheel 43 is rotated against the friction between said wheel 43 and said plate 42 thereby permitting the passage of the upright pin 36*e* of the driving plate 36, while the tone arm 3 is positioned above the tone arm rest 4.

As its driving plate 36 is further rotated to the original position as hereinbefore described, the stopper 68*a* of the stopper lever 68 movable integrally with said driving plate 36 kicks the engagement piece 24*e* on the intermediate lever 24 causing the upright boss 27, which has been engaged in the second slot 1*f* of the opening 1*e* in the mounting panel 1 with the triggering knob 7*a* being in the "ON" position, to be disengaged from the second slot 1*f* so that the intermediate lever 24 can be rapidly biased in the pulling direction of the tension spring 28. As the intermediate lever 24 is moved in the manner as hereinbefore described, the operating lever 25 is pivoted about its pivot 26 so that the idler wheel 14 can be brought into a retracted position and concurrently the triggering knob 7*a* is automatically returned to the "OFF" position. It is to be noted that, when the operating lever is thus pivoted such as to disengage the idler wheel from the capstan 20 of the turntable 2, the downwardly extending piece 25*b* on said lever 25 operates the switch SW in such a way as to turn said switch off, thus interrupting the power supplied from a power source to the motor.

From the foregoing, it is clear that the record player constructed in accordance with the teachings of the present invention can be operated in various ways. For example, the record player operates a predetermined number of time irrespective of the number of records to be mounted on the changer spindle. In other words, if only one record is mounted on the changer spindle and the cycle adjusting mechanism is adjusted such as to make the record player to operate six cycles by rotating the index wheel until the number "6" appears on the viewing window, the single record can be played 6 times in succession. Alternatively, if 10 records are mounted on the changer spindle control is adjusted such as to make the record player to operate 3 for only three cycles, the record player will cease to operate after three of the 10 records have been played.

Although the present invention has been fully described by way of example of the preferred embodiment, it is to be noted that various changes and modificationa are apparent to those skilled in the art without departing the scope thereof. Accordingly, the present invention is not to be limited by the embodiment as disclosed, but such changes and modifications should be construed as included within the scope thereof unless otherwise departing therefrom.

What is claimed is:

1. An automatic record player comprising a drive motor, a tone arm having a rotatable shaft, a switching knob, linkage means operated by said switching knob and coupled to said drive motor to energize said drive motor, a capstan, a turntable having a turntable gear thereon and a spindle projecting axially upwardly therefrom, an idler wheel coupled to said linkage means and operated thereby to selectively be engageable with said capstan and said turntable to transmit and interrupt the drive of said drive motor from the capstan to the turntable, a gear wheel having a substantially heart-shaped groove formed therein, an actuating member operatively coupled to said gear wheel to bring said gear wheel into engagement with said turntable gear, an actuating plate operatively connected to said linkage means to operate said actuating member for driving said gear wheel by means of said drive motor, a driving plate having at least one end and having an upright boss at said one end which upright boss engages said gear wheel and is moved reciprocally in engagement with said heart shaped groove formed in said gear wheel, an arm on the other end of said driving plate having a sloped surface in contact with said tone arm and adapted to move said tone arm vertically and a pin member operatively positioned and adapted to cause horizontal movement of said tone arm, a feeder operatively positioned and adapted to drop on the turntable successively each one of a stack of records mounted on the spindle, a feed link operatively connected to said driving plate to operate said feeder, a record size detecting plate projecting above the turntable and adapted to detect the size of the record dropping onto the turntable, a positioning plate mounted on the rotating shaft of the tone arm and rotated by the pin on said driving plate to select the dropping position of the tone arm, an index plate provided below and operatively coupled to said record size detecting plate and having thereon notched sides respectively adapted to engage the edge of said record diameter detecting plate and to engage one projecting end of said positioning plate so as to limit the rotation of the tone arm, said index plate being movable between retracted and operative positions, said driving plate capable of performing a reciprocal rotative motion between an initial position and a remote position during one rotation of said gear wheel whereby, when said driving plate is in the remote position, said index plate is brought into operative position to detach the size of the dropping record and to define the angle through which the tone arm swings at the beginning of playing of the record and when said driving plate is in the initial position, said index plate is brought into the retracted position, and an operatively positioned cycle adjusting mechanism including an index wheel of substantially cylindrical cross section having one end formed with a plurality of saw teeth and the other end formed with a recess, a seesaw member having one end formed with a feeler collapsibly engageable with said recess on said index wheel and the other end positioned above the path of travel of said projecting end of said positioning plate such that, only when said feeler is collapsed into said recess on said index wheel, said other end of said seesaw member is brought into a position to restrict the horizontal swinging movement of said tone arm to inhibit the latter to swing to a position above the lead-in groove of the record, means for intermittently rotating said index wheel in response to the reciprocal rotative motion of said driving plate, and a stopper lever pivotally supported by said driving plate and having one end in contact with a portion of said seesaw member and the other end positioned adjacent to said linkage means such that, only when said feeler is collapsed into said recess, said stopper lever is pivoted about its pivot with said other end thereof in position to kick said linkage means to disengage said idler wheel from said capstan and the turntable and concurrently to deenergize said driving motor.

2. An automatic record player as claimed in claim 1 further comprising a plurality of characters on the peripheral surface of said cycle adjusting mechanism index wheel, said characters corresponding in number to the number of said saw teeth for the purpose of indicating a presetting of the record player to a desired number of performances.

3. An automatic record player as claimed in claim 1, wherein said cycle adjusting mechanism index wheel rotating means comprises a bracket piece having one and journalled to a shaft extending through said index wheel and a connecting rod connected between the other end of said bracket and the driving plate and an operatively positioned collapsible pin movable between a projected and a retracted position and extending through a portion of said bracket piece adjacent to said other end of said bracket piece, whereby, each time said bracket piece is pivoted in response to the movement of said driving plate, said collapsible pin shifts each one of the saw teeth thereby permitting said index wheel to intermittently rotate in one direction.

4. An automatic record player as claimed in claim 1, wherein said cycle adjusting mechanism index wheel further comprises means operatively positioned to prevent the rotation of said index wheel in the opposite direction.

* * * * *